United States Patent [19]
Dixon

[11] 3,925,680
[45] Dec. 9, 1975

[54] METHOD AND SYSTEM FOR REGULATING PEAK RESIDENTIAL POWER DEMAND

[76] Inventor: William A. Dixon, 132 Stewart St., St. Simons Island, Ga. 31522

[22] Filed: Apr. 4, 1975

[21] Appl. No.: 565,224

[52] U.S. Cl. .................................. 307/39; 307/140
[51] Int. Cl.² ........................................ H02J 13/00
[58] Field of Search ............ 307/38, 34, 35, 39, 62, 307/140; 235/151.21; 236/91 D, 91 E; 62/157

[56] References Cited
UNITED STATES PATENTS

| | | | |
|---|---|---|---|
| 513,839 | 1/1894 | Talmage | 307/17 |
| 2,222,159 | 11/1940 | Taylor | 236/91 E |
| 2,266,252 | 12/1941 | Osterheld | 219/39 |
| 2,387,562 | 10/1945 | Brunot | 219/493 |
| 2,627,013 | 1/1953 | McCabe | 307/39 |
| 2,784,322 | 3/1957 | Johnson | 307/39 |
| 3,714,453 | 1/1973 | Delisle et al. | 307/39 |

*Primary Examiner*—James R. Scott
*Assistant Examiner*—M. Ginsburg
*Attorney, Agent, or Firm*—Burns, Doane, Swecker & Mathis

[57] ABSTRACT

A temperature monitoring means monitors temperature outside the residence and a supply system responsive to the monitoring means controls the supply of electrical power to major home appliances such as air conditioning devices, food preparation devices, clothes drying devices and water heating devices and the like. In one embodiment, major home appliances are arranged in pairs and connected to a main power distribution system in these pair arrangements through a load dispatcher including continuity sensitive switches. The appliances are continuously connected to the electrical power distribution system when the outdoor temperature is below a predetermined value. However, when the outdoor temperature exceeds the predetermined value, the continuity switches then control the supply of power to the appliances by supplying power to one of the appliances to the exclusion of the other in each pair arrangement. Whenever electrical power is not being supplied to the one of the appliances in the pair arrangement requiring power, the other of the appliances is supplied with electrical power. In accordance with another aspect of the invention, the outdoor temperature is monitored and controls the operation of an air conditioning unit. When the outdoor temperature exceeds a predetermined value, the air conditioner is cycled between on and off conditions on a timed, periodic basis without regard to the temperature inside the residence at least until the temperature outside the residence drops below the predetermined value. The air conditioner may be cycled between on and off conditions on the periodic basis until the outdoor temperature drops a predetermined amount below the predetermined value, for example, drops at least 5° or 6° below the predetermined value.

12 Claims, 5 Drawing Figures

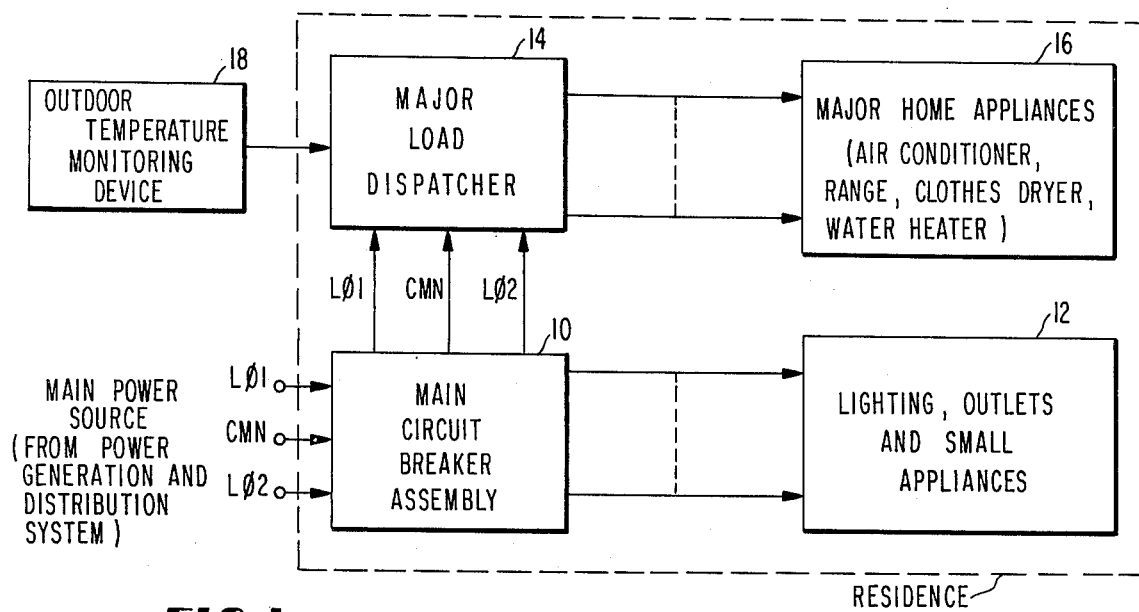
FIG.1
FIG.2
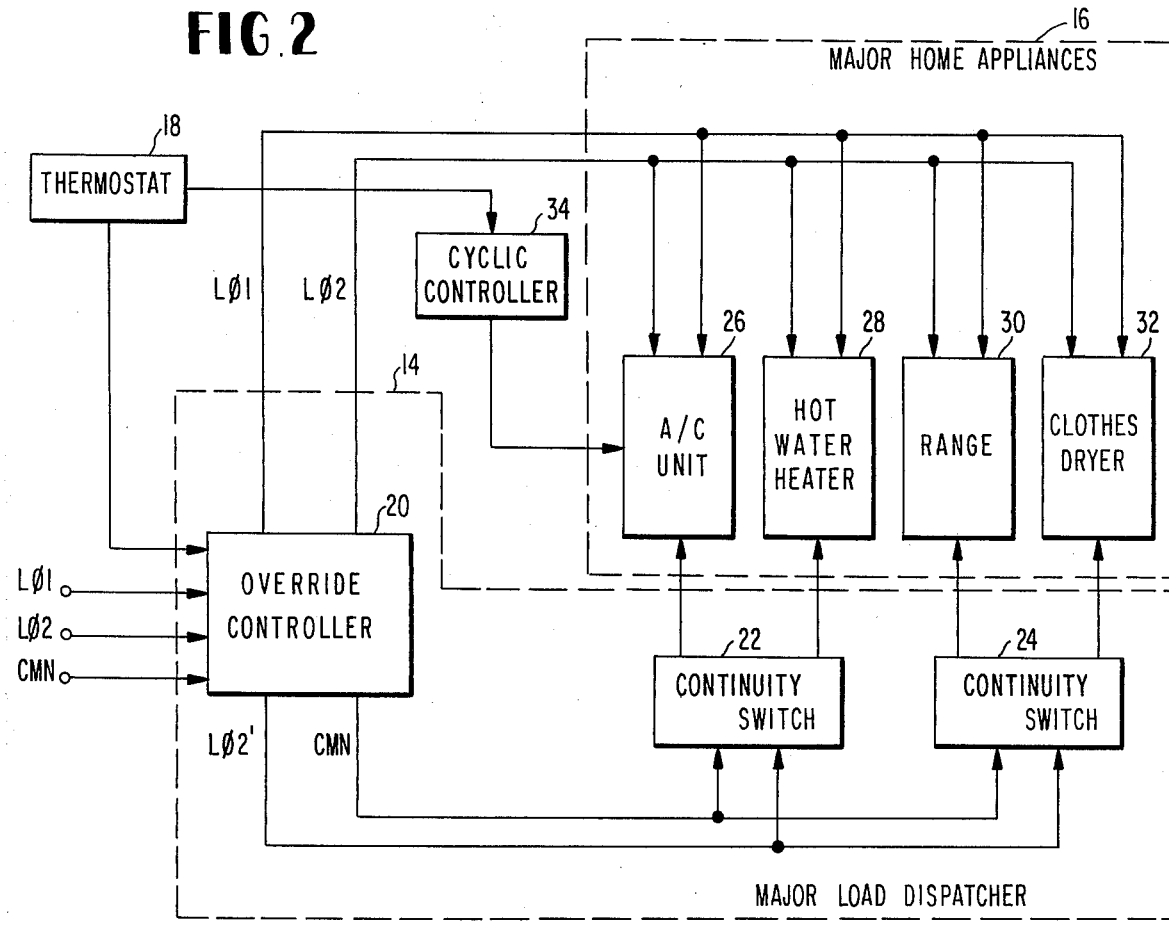

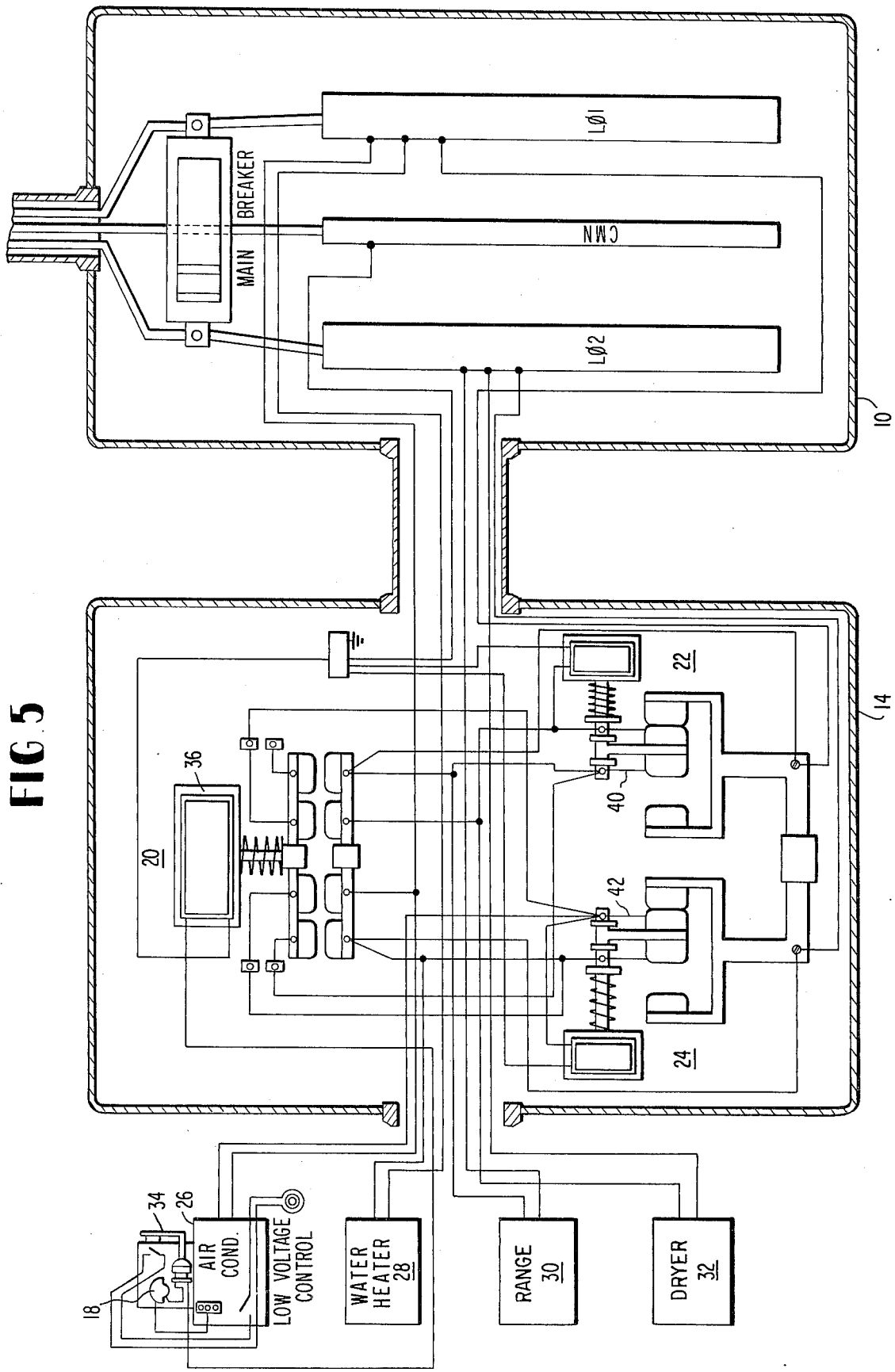

METHOD AND SYSTEM FOR REGULATING PEAK RESIDENTIAL POWER DEMAND

BACKGROUND OF THE INVENTION

The present invention relates to a method and system for regulating peak electrical power demands of residential users through the control of the supply of electrical power to major home appliances during periods of high outdoor temperatures.

The summer months have become a problem to almost all major utilities primarily because of the high usage of electrical power for air conditioning equipment during periods of high outdoor temperatures. The use of residential air conditioning equipment combined with other residential, commercial and industrial usage creates a high peak electrical demand which the utilities are now attempting to meet through the construction of new generating plants. Because the peak demand has grown rapidly, utilities are being hard pressed to meet the present electrical energy requirements even though these requirements typically occur for only relatively short periods of time in comparison to the overall time period during which energy is consumed.

It is accordingly an object of the present invention to provide a novel method and system for limiting the growth of peak electrical demand of residential users in a power generating and distribution system to thereby aid utilities in slowing the required rapid rate of construction of generating plants to a more orderly pace.

It is a further object of the present invention to provide a novel method and system for limiting the electrical demand of a given residence during periods of high outdoor temperatures in which peak electrical demand typically occurs.

It is yet another object of the present invention to provide a novel method and system for regulating peak electrical power demands of a residential user having an air conditioning unit connected to an electric power system through the timed cycling of the air conditioning unit in response to monitored outdoor temperature.

These and other objects and advantages of the present invention are accomplished through the provision of a temperature monitoring means for monitoring temperature outside the residence and a supply system responsive to the monitoring means for controlling the supply of electrical power to major home appliances such as air conditioning devices, food preparation devices, clothes drying devices and water heating devices and the like, i.e. appliances having their own supply circuits with independent overload protection. In accordance with one embodiment of the invention, major home appliances are arranged in pairs and connected to a main power distribution system in these pair arrangements through a load dispatcher including continuity sensitive switches. The appliances are continuously connected to the electrical power distribution system when the outdoor temperature is below a predetermined value. However, when the outdoor temperature exceeds the predetermined value, the continuity switches then control the supply of power to the appliances by supplying power to one of the appliances to the exclusion of the other in each pair arrangement. Whenever electrical power is not being supplied to the one of the appliances in the pair arrangement requiring power, the other of the appliances is supplied with electrical power.

In accordance with another aspect of the present invention, the outdoor temperature is monitored and controls the operation of an air conditioning unit. Specifically, when the outdoor temperature exceeds a predetermined value, the air conditioner is cycled between on and off conditions on a timed, periodic basis without regard to the temperature inside the residence at least until the temperature outside the residence drops below the predetermined value. The air conditioner may be cycled between on and off conditions on the periodic basis until the outdoor temperature drops a predetermined amount below the predetermined value, for example, drops at least 5 or 6 degrees below the predetermined value.

BRIEF DESCRIPTION OF THE DRAWINGS

FIG. 1 is a functional block diagram generally illustrating the present invention as connected to regulate the supply of power to major home appliances in a residence;

FIG. 2 is a functional block diagram illustrating the major load dispatcher of FIG. 1 in greater detail;

DETAILED DESCRIPTION

Figure 3:
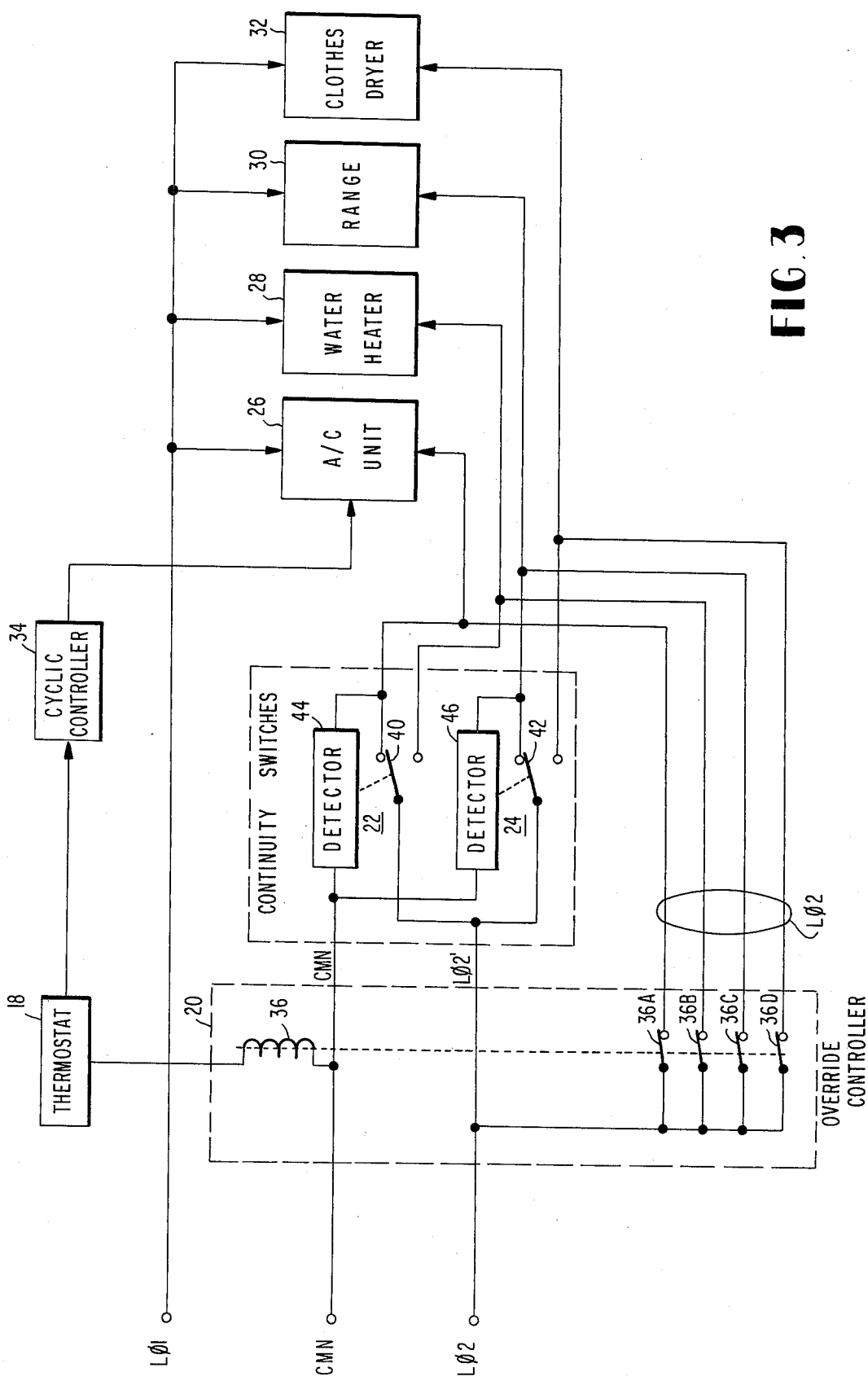
FIG. 3 is a functional block diagram illustrating the override controller and continuity switches of FIG. 2 in greater detail.

FIG. 1 illustrates one embodiment of the system in accordance with the present invention as utilized in a residence to regulate the power demands of a residential user by regulating the application of power to major home appliances such as an air conditioner, food preparation equipment (e.g., a range), a clothes dryer, a water heater, and the like.

Referring now to FIG. 1, a main power source from distribution lines is supplied to a main circuit breaker assembly 10 within the residence. The main power source typically includes two line phases $L\phi$ and $L\phi 2$ which provide about 120 volts a.c. when referenced to a common or ground input line CMN and provide about 220 volts a.c. when referenced to each other, i.e., about 220 volts a.c. line-to-line. The main circuit breaker assembly 10 supplies power to lighting fixtures, electrical outlets and small appliances generally indicated at 12 in the usual manner.

A major load dispatcher 14 receives power from the main circuit breaker assembly 10 and supplies power to major home appliances as is generally indicated at 16. An outdoor temperature monitoring device 18 such as a thermostat controls the operation of the major load dispatcher 14 on the basis of outdoor temperature as will hereinafter be described in greater detail.

In operation, the main circuit breaker assembly 10 may supply power to the lighting fixtures and the like generally indicated at 12 and to the major load dispatcher 14 in any suitable conventional manner. If the temperature outside the residence is below a predetermined value, as indicated by the outdoor temperature monitoring device 18, the major load dispatcher 14 supplies power to some of the major home appliances 16 to the exclusion of others. For example, the major load dispatcher 14 may normally supply all of the major home appliances 16 with electrical power as long as outdoor temperature remains below the predetermined value. When the outdoor temperature exceeds the predetermined value, e.g., exceeds 90°F., the major load dispatcher 14 may then operate to selectively supply power to those major home appliances requiring power to the exclusion of some of the other appliances which may also, at that time, require power.

By way of example, the outdoor temperature may exceed the predetermined temperature value of 90° at a time when both the air conditioner and water heater are in operation and are thus both creating a demand for power. When the 90° temperature is sensed, the major load dispatcher 14 may disconnect both the air conditioner and hot water heater from the supply lines of the main circuit breaker assembly 10 and reconnect only the air conditioner. Assuming the 90° outdoor temperature persists, the supplying of power to the air conditioner to the exclusion of the hot water heater will continue until the air conditioner cycles to an off condition. In this regard, the air conditioner may cycle to an off condition either through its ordinary cycle control or through the provision of a timed cycle control as will be more fully described hereinafter.

When the air conditioner cycles to its off condition, the major load dispatcher 14 senses this off condition and supplies power to the hot water heater at least until a requirement or demand for power to the air conditioner is sensed. It can thus be seen that under certain outdoor temperature conditions the air conditioner and hot water heater are energized on a demand basis with the air conditioner taking priority over the hot water heater, although the power demands of the air conditioner may also be regulated on a timed basis. In this same manner, power to other major appliances may be regulated both on a demand and priority basis to regulate peak power demands of the residence as will be more fully described hereinafter.

FIG. 2 functionally illustrates one embodiment of the major load dispatcher 14 of FIG. 1 in greater detail to facilitate an understanding of the operation of the present invention.

Referring now to FIG. 2, the power supply lines from the main circuit breaker assembly 10 of FIG. 1 including the two line phases $L\phi 1$ and $L\phi 2$ and the common or ground line CMN are supplied to an override controller 20 and a control signal is provided to the override controller 20 from the outdoor temperature monitoring device, e.g., a thermostat indicated at 18. The override controller 20 supplies power from one of the two line phases $L\phi 1$ to each of the plurality of major home appliances generally indicated at 16. The other line phase L $L\phi 2$ is supplied from the override controller 20 to continuity switches 22 and 24 which are also connected to common CMN as illustrated.

In the preferred embodiment of the invention, the continuity switches 22 and 24 are arranged to selectively supply power to the major home appliances in pairs with one of each of the supplied appliances being designated the primary unit and the other of the two appliances being designated the secondary unit. In the FIG. 2 embodiment, for example, the continuity switch 22 may selectively supply power to an air conditioning unit 26 and a hot water heater 28. The continuity switch 24 may selectively supply power to a range or other food preparation device 30 and a clothes dryer 32. The air conditioning unit 26 may be cycled in its normal manner or, above the predetermined outdoor temperature of 90°, may be cycled on and off periodically in a timed manner by a suitable conventional cyclic controller 34.

In operation, the override controller 20 ordinarily supplies power from the lines $L\phi 1$ and $L\phi 2$ to each of the major appliances 26, 28, 30 and 32. Other major appliances, i.e., appliances such as dishwashers, trash compactors and freezers which are individually supplied from the main circuit breaker assembly and have separate overload protectors, may also be supplied with power through the override controller 20 and may thus be operated in accordance with the present invention.

When the thermostat 18 indicates that the outdoor temperature is above the predetermined value, e.g., 90°F., the override controller 20 removes power from the line $L\phi 2$ going to each of the appliances. The line $L\phi 2'$ is then energized from the input line $L\phi 2$ and the continuity switches 22 and 24 thereafter control the application of power to the devices 26, 28, 30 and 32. Of course, the line $L\phi 2'$ supplying the continuity switches may be continuously energized as will hereinafter be apparent to one skilled in the art to which the invention pertains.

In the embodiment illustrated in FIG. 2 and described more fully hereinafter, the continuity switch 22 supplies power to the primary appliance, e.g., the air conditioning unit 26, to the exclusion of the secondary appliance, e.g., the hot water heater 28, as long as the air conditioning unit 26 requires or demands power. In this connection, the continuity switch 22 detects a demand for power by the primary appliance, i.e., air conditioning unit 26, and supplies power to the air conditioning unit 26 as long as the demand is present. When the air conditioning unit 26 no longer presents a demand for power, the continuity switch 22 then supplies power to the secondary appliance, i.e., the hot water heater 28 in the illustrated embodiment, at least until such time as the primary appliance (the air conditioning unit 26) again demands power.

Similarly, the continuity switch 24 ordinarily supplies power to the primary appliance, e.g., the range 30, as long as the range 30 presents a demand for power. When the range 30 is off, however, the continuity switch 24 supplies power to the clothes dryer 32 which, in the illustrated embodiment, is the designated secondary appliance. Again, however, when the range 30 presents a demand for power, the continuity switch 24 senses this demand and supplies power to the range 30 to the exclusion of the clothes dryer 32.

It can be seen that in this manner peak demand of the residential user is minimized during those periods of high outdoor temperatures. For example, in the illustrated embodiment only two major appliances, e.g., the air conditioning unit 26 and the range 30 or the air conditioning unit 26 and the clothes dryer 32, may be simultaneously drawing power from the power distribution system. As a result, peak demand on the electrical power generation and distribution system is minimized as outdoor temperatures increase and as peak demand on the generating and distribution system would ordinarily likewise increase.

It should be noted that electric clocks and outlets built into the appliances served by the system according to the present invention will still be operable continuously since one line phase voltage is always present. Thus, for example, the line voltage $L\phi 1$ supplied from the override controller 20 to the range 30 is available continuously to supply single phase, 120 volt a.c. power to operate a clock or an outlet built into the range 30.

Moreover, it should be noted that the air conditioning unit 26 may tend to run most of the time to the exclusion of the hot water heater 28 on days during which the predetermined outdoor temperature is exceeded for long periods of time. Accordingly, the cyclic controller 34 may cycle the air conditioning unit 26 between on and off conditions periodically rather than on a demand basis to insure that power is supplied to the hot water heater 28 during at least a portion of this time period.

To further facilitate an understanding of the operation of the present invention, the override controller 20 and the continuity switches 22 and 24 of FIG. 2 are illustrated schematically in greater detail in FIG. 3.

Referring now to FIG. 3, one line phase voltage L$\phi$1 is supplied to each of the major home appliances 16 as was previously described. The other line phase voltage L$\phi$2 is supplied continuously to each of the appliances at temperatures below the predetermined outdoor temperature through the relay or switch contacts 36a, 36b, 36c and 36d of an electromagnetically operated contactor or relay generally indicated at 36. When the thermostat 18 detects an outdoor temperature greater than the predetermined value, the coil of the contactor 36 is energized and the switch contacts 36a–36d are opened, and, thereafter, the line phase voltage L$\phi$2 must be supplied to the appliances 16 through the continuity switches 22 and 24.

In this connection, each of the continuity switches 22 and 24 may include an electromagnetically operable selector switch connected to the line phase voltage L$\phi$2' as is generally indicated at 40 and 42, respectively. The selector switches 40 and 42 are connected to supply the line phase voltage L$\phi$2' to the pairs of appliances in a mutually exclusive manner as was previously described. Each of the continuity switches 22 and 24 may also include a continuity detector 44 and 46, respectively, connected to detect a demand for power (or a lack of demand for power) by the primary appliances, i.e. by the air conditioning unit 26 and range 30.

In operation, the line phase voltage L$\phi$1 may be supplied to each of the appliances continuously as illustrated. In this connection, it should be noted that a separate transmission line for the line phase voltage L$\phi$1 may typically be provided to each appliance since each of the major appliances is on a separate overload protection circuit in the main circuit breaker assembly 10. The line phase voltage L$\phi$2 is normally supplied to each of the appliances through the closed switch contacts 36A–36D of the contactor 36 and may also be supplied over separate lines connected to each appliance. It can thus be seen that below the predetermined temperature, the appliances are all provided with power on a continuous basis.

When the thermostat 18 detects an outdoor temperature above the predetermined value, the contactor 36 is energized and the switch contacts 36A–36D are opened. The line phase voltage L$\phi$2 must then be supplied to the appliances through the continuity switches 22 and 24.

With continued reference to FIG. 3, the selector switch 40 of the continuity switch 22 is kept in the position illustrated to provide power to the air conditioning unit 26 as long as the detector 44 detects a continued demand for power by the air conditioning unit 26. Similarly, the selector switch 42 of the continuity switch 24 remains in the illustrated position as long as the detector 46 detects a continued demand for power by the range 30. As soon as the detectors 44 and 46 detect a lack of demand by the respective air conditioning unit 26 and the range 30, the switches 40 and 42 change positions to supply power to the respective water heater 28 and the clothes dryer 32. As long as the air conditioning unit 26 and the range 30 do not require power, the switches 40 and 42 remain in the positions through which the water heater 28 and clothes dryer 32 are supplied with the line phase voltage L$\phi$2'. However, the sensing of a demand for power by either the detector 44 or the detector 46 will result in a change in the positions of the associated switches 40 and 42, respectively, to return these switches to their illustrated positions.

The invention may be implemented in various circuit configurations to perform the functions described herein. One embodiment of a control system for carrying out the present invention in a typical residential electrical supply system is illustrated in FIG. 4.

Figure 4:
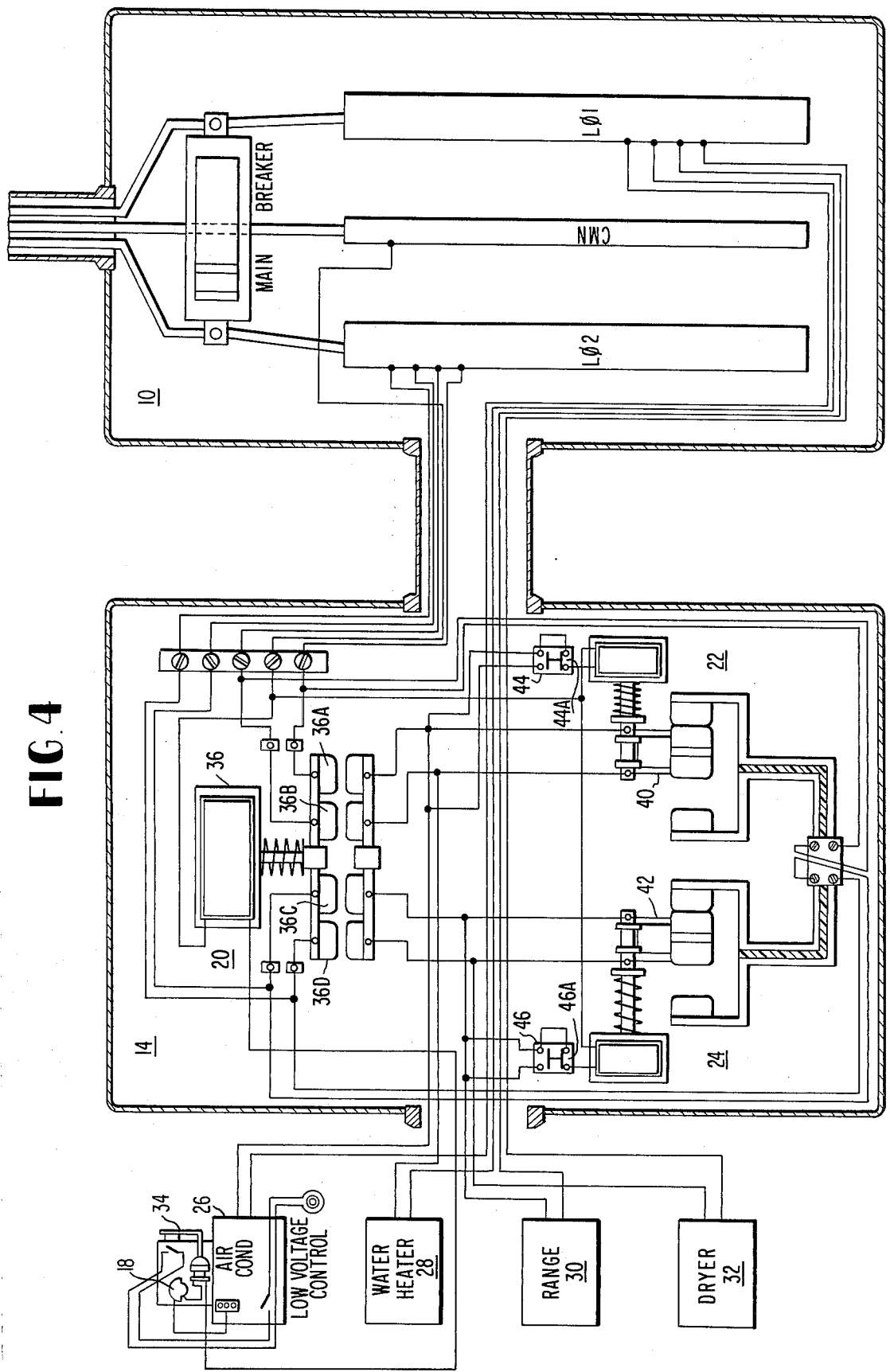
FIG. 4 is a detailed schematic diagram illustrating one embodiment of the invention installed in a residence; and, FIG. 5 is a detailed schematic diagram illustrating another embodiment of the invention installed in a residence.

Referring now to FIG. 4 wherein the elements previously described have been given like numerical designations, the line phase voltages L$\phi$1 and L$\phi$2 and the common line CMN are connected from the main circuit breaker assembly 10 to the major load dispatcher 14. The main circuit breaker assembly 10 is schematically illustrated and it should be understood that each of the lines supplying power to the appliances may be separately protected in a conventional manner, e.g., through the use of conventional circuit breakers for each appliance.

One of the line phase voltages L$\phi$1 is run directly to each of the appliances 26–32. The other line phase voltage L$\phi$2 is supplied to the override controller 20 and specifically to the contactor assembly 36 including the contacts 36A–36D. The line phase voltage L$\phi$2 is also supplied to the continuity switches 22 and 24 which include the respective selector switches 40 and 42 and the respective continuity detectors 44 and 46. The thermostat and cyclic controller unit 18, 34 is connected to control the operation of the contactor 36 and may also periodically cycle the air conditioner 26 as was previously described.

The FIG. 4 embodiment of the invention operates essentially as was previously described in connection with FIG. 3 to selectively control the supply of power to the appliances 26–32 on a priority and outdoor temperature basis. The contactor assembly 36 may normally be in a closed position so that the line phase voltage L$\phi$2 is supplied directly therethrough to the appliances. Any suitable conventional electromagnetically operable breaker assembly may be utilized for this purpose.

The selector switches 40 and 42 may likewise be conventional electromagnetically operable breakers as illustrated. The detectors 44 and 46 detect current flow through the lines running to the respective air conditioning unit 26 and the range 30 in any suitable conventional manner. For example, in the illustrated embodiment the detectors may include a sensing coil (not shown) which senses current flow to the primary units. Such sensing may be accomplished in a conventional manner such as, for example, by sensing a voltage drop between two spaced points in the system.

When current flow to the air conditioner, for example, is interrupted, the sensing coil momentarily interrupts the circuit path through which the coil of the selector switch 40 is energized, i.e., opens the contact 44A. The selector switch 40 may thereby be mechanically driven through a spring or other means to the position at which the water heater 28 is energized, e.g., the switch 40 is driven to the left in FIG. 4. When the air conditioning unit 26 is again turned on, the coil of the selector switch 40 is energized from the line phase voltage L$\phi$1 through the closed contact 44A and the selector switch 40 is then moved into the illustrated position to energize the air conditioning unit 26. The continuity switch 24 may operate in the same manner in conjunction with the detector 46 to selectively supply power to the range 30 and the dryer 32.

In the FIG. 4 embodiment, the thermostat 18 and the cyclic controller 34 are illustrated as a single unit supplied with the line phase voltage L$\phi$1 from the air conditioning unit 26. The thermostat 18 in the illustrated embodiment detects the outdoor temperature and energizes both the air conditioner cyclic controller 34 and the coil 36 of the override controller 22 in response to a sensed outdoor temperature above the predetermined value. It should be noted in this regard, that the air conditioner 26 may continue to be cycled on and off periodically by the cyclic controller 34 until the outdoor temperature drops a few degrees below the predetermined value so as to provide an upper and lower limit of control. Such upper and lower limits are typically built into conventional thermostats to provide a range rather than a single value of control. Moreover, it is contemplated that this range of control may be set as desired to provide a range of at least 5° or 6° between the upper turn-on control limit and the lower turn-off control limit.

FIG. 5 illustrates another circuit configuration which may be utilized to implement the present invention in a typical residential electrical power supply system. The various elements illustrated in FIG. 5 have numbers corresponding to those in FIG. 4 and are alike except for some of the wiring connections and the manner in which the continuity switches 22 and 24 are arranged to detect the demand conditions of the air conditioning unit 26 and the range 30 for control thereof.

Specifically, the continuity switches 22 and 24 are connected to be controlled by the coils of the selector switches 40 and 42 without the necessity of separate current flow sensors as in the FIG. 4 embodiment. Moreover, the normally closed and normally open contacts of the selector switch 40 are connected to a single bus bar as are the normally closed and normally open contacts of the selector switch 42. Since the operation of the FIG. 5 embodiment is functionally the same as that of FIG. 4, it will not be described herein in detail.

The apparatus is flexible in that it allows the utility and/or the customers to choose which application they wish or desire, such as the cyclic operation on a continual basis, or at a pre-set temperature value. This device will allow the complete disconnect of water heater and/or dryer after the predetermined outside temperature is reached and may be built into a solid state and/or electronic system.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for regulating peak electrical power demands of residential users having a plurality of major home appliances including an air conditioning unit connected to a main electrical power distribution system of a residence comprising:
    means for disconnecting the appliances from the main electrical power distribution system in response to the temperature outside the residence, related to the peak power demands, exceeding a predetermined value;
    a plurality of continuity sensitive switches;
    means for connecting the appliances arranged in pairs to the main electrical power distribution system through said continuity sensitive switches;
    said continuity switches each including means for detecting requirements for electrical power for one of the appliances in each pair arrangement;
    means for supplying electrical power to said one of the appliances requiring power to the exclusion of the other appliance in each pair arrangement; and,
    means for supplying electrical power to said other of the appliances in each pair arrangement whenever electrical power is not being supplied to said one of the appliances in each pair arrangement.

2. The apparatus of claim 1 further comprising means for cyclically operating one of the appliances requiring power on a timed basis in response to the temperature outside the residence exceeding a predetermined value.

3. The apparatus of claim 2 wherein the cyclically operated one of the appliances is an air conditioning unit.

4. The apparatus of claim 1 including thermostatic control means connected to said disconnecting means and disposed outside the residence for monitoring outdoor temperature and controlling said disconnecting means in response to the monitored outdoor temperature.

5. Apparatus for regulating peak power demands of major residential appliances including air conditioning and food preparation devices of residential users in an electrical power distribution system connected to a residence comprising:
    means for monitoring the temperature outside the residence related to the peak power demands; and,
    means for supplying electrical power to the devices in response to the monitored temperature exceeding a predetermined value, said supplying means including:
        means for detecting requirements for electrical power for at least some of the devices; and,
        means for supplying electrical power to one of the devices requiring power to the exclusion of at least one of the others irrespective of a requirement for power of said at least one of the others.

6. The apparatus of claim 5 wherein said one of the devices comprises an air conditioning unit.

7. The apparatus of claim 5 further comprising means for cyclically operating one of the appliances requiring power on a timed basis in response to the temperature outside the residence exceeding a predetermined value.

8. The apparatus of claim 7 wherein the cyclically operated one of the devices is an air conditioning unit.

9. A method of regulating peak electrical power demands of major home appliances of residential users in an electrical power distribution system including a main electrical power supply connected to supply electrical power to a residence, the method comprising the steps of:

disconnecting the appliances from the main electrical power supply in response to the temperature outside the residence, related to the peak power demands, exceeding a predetermined value;

connecting the appliances arranged in pairs to the main electrical power supply through continuity sensitive switches;

detecting requirements for electrical power for one of the appliances in each pair arrangement;

supplying electrical power to said one of the appliances requiring power to the exclusion of the other of the appliances in each pair arrangement; and, supplying electrical power to said other of the appliances in each pair arrangement whenever electrical power is not being supplied to said one of the appliances in each pair arrangement.

10. The method of claim 9 further comprising the step of the cyclically operating said one of the appliances requiring power in at least one pair arrangement on a timed basis between on and off conditions in response to the temperature outside the residence exceeding the predetermined value.

11. A method for regulating peak electrical power demands of major residential appliances including air conditioning and food preparation devices of residential users in an electrical power distribution system serving a residence comprising the steps of:

monitoring the temperature outside the residence related to the peak power demands and, in response to the monitored temperature exceeding a predetermined value, supplying electrical power to the devices by:

detecting requirements for electrical power for at least some of the devices;

supplying electrical power to one of the devices requiring power to the exclusion of at least some of the others; and, supplying electrical power to another of the devices requiring power to the exclusion of said one and at least some of the remaining ones of the devices.

12. A method for regulating peak electrical power demands of residential users having an air conditioning unit connected in an electric power system comprising the steps of:

monitoring the temperature outside the residence related to the peak power demands and, in response to the monitored temperature outside the residence exceeding a predetermined value, cycling the air conditioning unit between on and off conditions on a timed, periodic basis without regard to the temperature inside the residence at least until the temperature outside the residence drops below the predetermined value, and in response to the latter temperature, controlling the air conditioning unit with regard to the temperature inside the residence.

* * * * *